US009318742B2

(12) United States Patent
Fujino et al.

(10) Patent No.: US 9,318,742 B2
(45) Date of Patent: Apr. 19, 2016

(54) POSITIVE ACTIVE MATERIAL FOR NONAQUEOUS ELECTROLYTE SECONDARY BATTERIES AND NONAQUEOUS ELECTROLYTE SECONDARY BATTERY

(75) Inventors: Yukiko Fujino, Kyoto (JP); Yoshinobu Yasunaga, Kyoto (JP); Toru Tabuchi, Kyoto (JP); Tokuo Inamasu, Kyoto (JP); Toshiyuki Nukuda, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 159 days.

(21) Appl. No.: 13/577,659

(22) PCT Filed: Feb. 16, 2011

(86) PCT No.: PCT/JP2011/053210

§ 371 (c)(1), (2), (4) Date: Aug. 8, 2012

(87) PCT Pub. No.: WO2011/102358

PCT Pub. Date: Aug. 25, 2011

(65) Prior Publication Data

US 2012/0308893 A1 Dec. 6, 2012

(30) Foreign Application Priority Data

Feb. 17, 2010 (JP) ................................ 2010-032238

(51) Int. Cl.

| | |
|---|---|
| ***H01M 4/583*** | (2010.01) |
| ***H01M 4/48*** | (2010.01) |
| ***H01M 4/52*** | (2010.01) |
| ***H01M 4/525*** | (2010.01) |
| ***H01M 4/58*** | (2010.01) |
| ***C01B 25/37*** | (2006.01) |
| ***H01M 4/36*** | (2006.01) |

(52) U.S. Cl.

CPC ............ *H01M 4/5825* (2013.01); *C01B 25/37* (2013.01); *H01M 4/366* (2013.01)

(58) Field of Classification Search

None

See application file for complete search history.

(56) References Cited

U.S. PATENT DOCUMENTS

2009/0023069 A1* 1/2009 Tian et al. .................. 429/231.5

FOREIGN PATENT DOCUMENTS

| | | | | |
|---|---|---|---|---|
| JP | 2949229 | | 9/1999 | |
| JP | 2002-056848 | * | 2/2002 | .............. H01M 4/58 |
| JP | 2002-530835 | | 9/2002 | |
| JP | 4292317 | | 7/2009 | |
| JP | 2009-231206 | | 10/2009 | |

(Continued)

OTHER PUBLICATIONS

English translation of Fujiwara et al (JP 2002-056848).*

(Continued)

*Primary Examiner* — Yoshitoshi Takeuchi

(74) *Attorney, Agent, or Firm* — Jianq Chyun IP Office

(57) ABSTRACT

An object is to provide a positive active material for nonaqueous electrolyte secondary battery, which is capable of providing a battery with excellent cycle performance. Provided are a positive active material for nonaqueous electrolyte secondary battery, which includes an Fe-containing lithium vanadium phosphate compound having a NASICON-type structure, wherein in the Fe-containing lithium vanadium phosphate compound, the percentage of iron atoms relative to the sum of vanadium and iron atoms is 2% or more and 20% or less; and the like.

8 Claims, 1 Drawing Sheet

(56) References Cited

FOREIGN PATENT DOCUMENTS

| | | |
|---|---|---|
| JP | 2010-003593 | 1/2010 |
| TW | 200729586 | 8/2007 |
| TW | 200805734 | 1/2008 |
| WO | 2007043665 | 4/2007 |

OTHER PUBLICATIONS

Ren et al, Preparation and Electrochemical Studies of Fe-Doped Li3V2(PO4)3 Cathode Materials for Lithium-Ion Batteries, 1357-1362 J. Power Sources 162 (2006).*

Ren et al., "Preparation and electrochemical studies of Fe-doped Li3V2(PO4)3 cathode materials for lithium-ion batteries", Journal of Power Sources, Sep. 15, 2006, pp. 1357-1362, vol. 162, No. 2.

Ren et al., "Core-Shell Li3V2(PO4)3@C Composites as Cathode Materials for Lithium-Ion Batteries", Journal of Physical Chemistry C, Mar. 18, 2008, p. 5689-5693, vol. 112, No. 14.

Wang et al., "Studies of Li3V2(PO4)3 Additives for the LiFePO4-Based Li Ion Batteries", Journal of Physical Chemistry C, Dec. 13, 2007, p. 308-312, vol. 112, No. 1.

Yinghua Chen et al. (2009), "Preparation and electrochemical performance studies on Cr-doped Li3V2(PO4)3 as cathode materials for lithium-ion batteries", Electrochimica Acta, vol. 54, Issue 24, pp. 5844-5850, May 2009.

Quan Kuang et al. (2010), "Synthesis and electrochemical properties of Co-doped Li3V2(PO4)3 cathode materials for lithium-ion batteries", Electrochimica Acta, vol. 55, Issue 5, pp. 1575-1581, Nov. 2010.

* cited by examiner

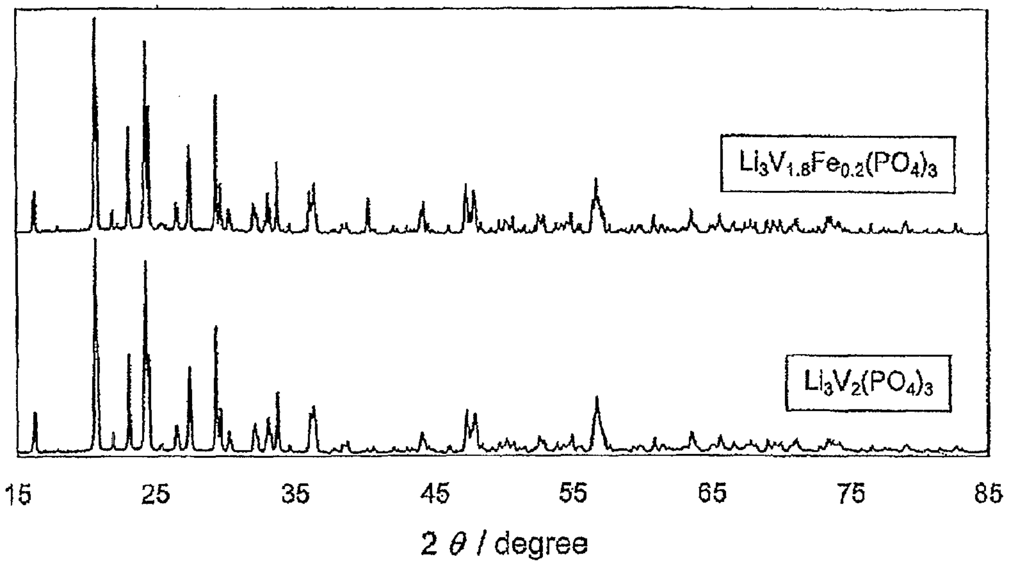
Li3V1.8Fe0.2(PO4)3
Li3V2(PO4)3
15
25
35
45
55
65
75
85
2 θ / degree

POSITIVE ACTIVE MATERIAL FOR NONAQUEOUS ELECTROLYTE SECONDARY BATTERIES AND NONAQUEOUS ELECTROLYTE SECONDARY BATTERY

CROSS-REFERENCE TO RELATED APPLICATION

This application is a 371 of international application of PCT application serial no. PCT/JP2011/053210, filed on Feb. 16, 2011, which claims the priority benefit of Japan application no. 2010-032238, filed on Feb. 17, 2010. The entirety of each of the above-mentioned patent applications is hereby incorporated by reference herein and made apart of this specification.

TECHNICAL FIELD

The present invention relates to a positive active material for nonaqueous electrolyte secondary batteries and to a nonaqueous electrolyte secondary battery using the same.

BACKGROUND ART

Nonaqueous electrolyte secondary battery has relatively high energy density. Using this advantage, in recent years, they have been widespread as power source for small consumer equipment such as mobile devices typified by mobile phone. In addition to applications to small consumer equipment, nonaqueous electrolyte secondary battery are expected to be developed also for medium-size and large-size industrial applications for electricity storage, electric vehicle, hybrid vehicle, or the like.

A nonaqueous electrolyte secondary battery generally includes a positive electrode containing a positive active material, a negative electrode containing a negative active material, a separator, and a nonaqueous electrolyte containing a nonaqueous solvent and an electrolyte salt.

As a positive active material forming a nonaqueous electrolyte secondary battery, a lithium-containing transition metal oxide is widely known, while as a negative active material, a carbon material such as graphite is widely known. As a nonaqueous electrolyte, one obtained by dissolving an electrolyte salt such as lithium hexafluorophosphate ($LiPF_6$) in a nonaqueous solvent containing ethylene carbonate as a main constituent is widely known.

Nowadays, a large number of materials are known as positive active materials for nonaqueous electrolyte secondary batteries such as lithium ion secondary battery. Examples of the most commonly known positive active materials include lithium-containing transition metal oxides having an operating potential of about 4 V, whose basic structure is lithium cobalt oxide ($LiCoO_2$), lithium nickel oxide ($LiNiO_2$), lithium manganese oxide ($LiMn_2O_4$) with a spinel-type structure, or the like. In particular, $LiCoO_2$ is excellent in terms of charge and discharge performance and energy density, and thus has been widely adopted as a positive active material for small-capacity lithium ion secondary batteries having a battery capacity of up to 2 Ah.

However, in consideration of future development for applications to medium-size or large-size batteries, particularly for industrial applications that are expected to be in great market, because a battery for industrial applications is possibly used in a high-temperature environment where a small consumer battery would not be used, the safety of a battery is of extreme importance. In addition, in such a high-temperature environment, not only a lithium ion secondary battery but also a nickel-hydrogen battery, a nickel-cadmium battery, or a lead battery has an extremely short life. Therefore, in the present situation, there is no battery that satisfies users' demand. Meanwhile, a capacitor that has a relatively long life even in such a high-temperature environment has low energy density, and does not satisfy users' demand. Accordingly, there is a need for a battery that has high safety and a long life even in a high-temperature environment and also has high energy density.

As a countermeasure, lithium iron phosphate ($LiFePO_4$) having an olivine-type structure has been proposed as a positive active material having excellent safety. In $LiFePO_4$, oxygen and phosphorus have a covalent bond. Therefore, no oxygen gas or the like is generated even in a high-temperature environment, and safety is thus high.

However, in $LiFePO_4$, the insertion/extraction of lithium takes place at a potential of about 3.4 V relative to the lithium metal potential. Therefore, there is a problem in that its energy density is low as compared with conventional lithium-containing transition metal oxides.

Then, as a positive active material having relatively high energy density and excellent safety, attention has recently been focused on a lithium-containing phosphate compound having a NASICON-type structure, in which the insertion/extraction of lithium takes place at about 4 V relative to the lithium metal potential. A typical example of such a lithium-containing phosphate compound includes lithium vanadium phosphate ($Li_3V_2(PO_4)_3$). $Li_3V_2(PO_4)_3$ has a high lithium content per formula weight, and when all Li is extracted, the theoretical capacity is 197 mAh/g. Therefore, it is expected to serve as a positive active material having both high safety and high energy density.

Patent Document 1 discloses the invention of "a lithium secondary battery including a first electrode containing an electrode active material represented by the nominal general formula $Li_{3-x}M'_yM''_{2-y}(PO_4)_3$ (wherein M' and M" are the same or different, at least one of M' and M" has more than one oxidation state, and $0 \leq y \leq 2$), a second counter electrode containing an intercalation active material, and an electrolyte, wherein x=0 under a first condition and $0 \leq x \leq 3$ under a second condition, M' and M" are each a metal or a semimetal, and at least one of M' and M" has a higher oxidation state than the oxidation state under the first condition" (claim 1) and "the lithium secondary battery according to claim 1, wherein M' and M" are each independently selected from the group consisting of Ti (titanium), V (vanadium), Cr (chromium), Mn (manganese), Fe (iron), Co (cobalt), Mo (molybdenum), and Cu (copper)" (claim 5).

Patent Document 1 states the following: "The present invention provides a lithium metal phosphate compound containing an oxidizable metal. Such a metal can have more than one oxidation state. The metal in the lithium metal phosphate compound exists in an oxidation state lower than the highest oxidation state. Therefore, the metal can be oxidized, providing the ability of extracting one or more Li+ ions" (page 13, lines 18 to 22); as a result, it is possible that "the object, feature, and advantage of the present invention include an improved lithium-based electrochemical cell or battery that has improved charge-discharge characteristics and high discharge capacity and maintains the complete state during cycle operation" (page 6, lines 42 to 44). As the above active material, $Li_3V_2(PO_4)_3$ is shown in the Examples of Patent Document 1, and also $Li_3FeV(PO_4)_3$ and $Li_3AlTm(PO_4)_3$ are mentioned as examples in the Best Mode for Carrying Out the Invention.

However, Patent Document 1 nowhere states or suggests that cycle performance is significantly improved when, in the general formula $Li_{3-x}M'_yM''_{2-y}(PO_4)_3$, Fe and V are selected as M' and M'', and the value of y is within a range of 0.04 to 0.4.

Patent Document 2 discloses the invention of "a lithium ion battery including a first electrode having an active material whose first condition is the nominal general formula $Li_{3-x}M'_yM''_{2-y}(PO_4)_3$ wherein x=0 and 0≤y≤2 and second condition is the nominal general formula $Li_{3-x}M'_yM''_{2-y}(PO_4)_3$ wherein 0<x≤3, wherein M'' is a transition metal, and M' is a non-transition metal element selected from the group consisting of metals and metalloids; a second electrode that is a counter electrode opposed to the first electrode; and an electrolyte between the electrodes" (claim 1).

Patent Document 2 states that the use of the above active material is advantageous in that "the object, feature, and advantage of the present invention include an improved lithium-based electrochemical cell or battery that has improved charge-discharge characteristics and high discharge capacity and also maintains its completeness during charge-discharge" (page 11, lines 1 to 3). In the Examples of Patent Document 2, it is stated that various $Li_{3-x}M'M''(PO_4)_3$ and $Li_{3-x}M^{II}M^{IV}(PO_4)_3$ such as $Li_3V_2(PO_4)_3$ and $Li_3AlV(PO_4)_3$ show excellent charge-discharge reversibility and capacity. However, Patent Document 2 nowhere describes or suggests that V and Fe are selected as M' and M."

Patent Document 3 discloses the invention of a lithium-vanadium phosphate composite compound substituted a part of vanadium, and states the following: "In the lithium-vanadium phosphate composite compound of the present invention, vanadium is partially substituted with Zr, Ti, and/or Al; as a result, the high-temperature phase, which is usually stable at high temperatures, is stabilized even at room temperature. Accordingly, the high-temperature phase stabilized at room temperature leads to significantly improved positive electrode characteristics. That is, according to the invention of the present application, the high-temperature phase having high ion conductivity and ion diffusibility is stabilized at room temperature, whereby the low charge-discharge capacity, a disadvantage of $Li_3V_2(PO_4)_3$ and $Li_3Fe_2(PO_4)_3$, is improved" (paragraph 0009). In the Examples of Patent Document 3, a compound obtained by partially substituting vanadium of a lithium-vanadium phosphate composite compound with Al, Ti, or Zr in an amount within a range of 5 to 20 mol % is shown, and it is shown that "by substituting a predetermined amount of vanadium with at least one kind of divalent or higher-valent cation selected from aluminum, titanium, and zirconium, the ion-conducting phase that is stable at high temperatures is stabilized also at room temperature, whereby ion conductivity is improved, ion diffusibility is increased, and charge-discharge capacity is improved" (paragraph 0029).

Patent Document 4 relates to a 3V battery for memory backup and discloses the invention of "a lithium ion secondary battery including a positive electrode containing as an active material a NASICON-type compound represented by the chemical formula $Li_nM_2(XO_4)_3$ (wherein n, M, and X are each as follows: 0≤n≤3, M=at least one metal element selected from Al, Ti, Ni, V, Nb, and Mn, and X=P, S, Mo, W, and As), a negative electrode containing a carbonaceous material capable of electrochemically inserting/extracting lithium, and a nonaqueous electrolyte solution" (claim 1). Patent Document 4 states the following: "Because of the inclusion of the positive electrode containing as an active material a NASICON-type compound represented by the chemical formula $Li_nM_2(XO_4)_3$ (wherein n, M, and X are each as follows: 0≤n≤3, M=at least one metal element selected from Fe, Ti, Ni, V, Nb, and Mn, and X=P, S, Mo, W, and As), a negative electrode containing a lithium-containing carbonaceous material capable of electrochemically inserting and extracting lithium, and a nonaqueous electrolyte solution, it is possible to provide a long-life lithium ion secondary battery that shows a stable operating voltage, shows an excellent capacity retention ratio, and has excellent cycle performance. In addition, particularly in the case of using a $V_2(SO_4)_3$ NASICON-type compound as a positive active material, a long-life 3V battery suitable for backup was achieved" (paragraph 0033). In the Example of Patent Document 4, $V_2(SO_4)_3$ and $LiTi_2(PO_4)_3$ are shown as compounds that satisfy the above chemical formula.

Patent Document 5 discloses the invention that relates to "an active material for lithium secondary batteries, which is represented by the general formula $Li_aM_b(PO_4)_{1-x}(BO_3)_x$ (wherein M is one or more kinds of transition metal elements selected from the group consisting of Ti, V, Cr, Mn, Fe, Co, and Ni, 0<a, 0<b, 0.5<a+b≤2, 0<x<1, and a and b are selected such that the general formula maintains electrical neutrality)" (claim 1). Patent Document 5 describes the partial substitution of $PO_4$ with $BO_3$ for the purpose of "providing a polyanionic active material having excellent high rate discharge performance and a lithium secondary battery using the same" (paragraph 0014). In the Example of Patent Document 5, it is shown that in $Li_3V_2(PO_4)_{3-x}(BO_3)_x$ having $PO_4$ partially substituted with $BO_3$, "when x is within a range of 1/64 to 1/4, surprisingly, the high rate discharge characteristic value is found improved over $Li_3V_2(PO_4)_3$ (x=0)" (paragraph 0061).

However, the lithium vanadium phosphate compounds and derivatives thereof shown in these prior art documents have problems in that they are not necessarily excellent in terms of the performance of battery capacity retention after repeated charge-discharge cycle of a battery. That is, there is a problem in that the cycle performance is not necessarily excellent.

PRIOR ART DOCUMENTS

Patent Documents

Patent Document 1: JP 4292317 B1
Patent Document 2: JP 2002-530835 W
Patent Document 3: JP 2949229 B1
Patent Document 4: JP 2002-56848 A
Patent Document 5: JP 2010-3593 A

SUMMARY OF THE INVENTION

Problems to be Solved by the Invention

The present invention has been accomplished in view of the problems mentioned above. An object of the present invention is to provide a positive active material for nonaqueous electrolyte secondary battery, which is capable of providing a battery with excellent cycle performance. Another object is to provide a nonaqueous electrolyte secondary battery having excellent cycle performance.

Means for Solving the Problems

The technical configuration and function effects of the present invention are as follows. However, the function mechanism includes presumptions, and whether it is right or wrong does not limit the present invention.

The positive active material for nonaqueous electrolyte secondary battery of the present invention is a positive active material for nonaqueous electrolyte secondary battery, including an Fe-containing lithium vanadium phosphate compound having a NASICON-type structure, wherein the Fe-containing lithium vanadium phosphate compound contains at least lithium (Li), vanadium (V), and iron (Fe) as metal elements, with the percentage of iron atoms relative to the sum of vanadium and iron atoms being 2% or more and 20% or less.

In the positive active material for nonaqueous electrolyte secondary battery of the present invention, it is preferable that the percentage of iron atoms relative to the sum of vanadium and iron atoms is 2% or more and 10% or less.

It is preferable that the positive active material for nonaqueous electrolyte secondary battery of the present invention further includes a different phase having a crystal structure other than a NASICON-type structure. It is also preferable that the different phase having a crystal structure other than a NASICON-type structure is made of $LiFePO_4$ having an olivine-type structure.

The positive active material for nonaqueous electrolyte secondary battery of the present invention includes an Fe-containing lithium vanadium phosphate compound represented by the general formula $Li_{3-x}V_{2-y-z}Fe_yM_z(PO_4)_3$ (wherein $0 \le x < 3$, $0.04 \le y \le 0.4$, $0 \le z \le 0.1$, while $0.04 \le y+z \le 0.4$, and M represents at least one metal element selected from Al, Cr, Mg, Mn, Ni, and Ti).

In the positive active material for nonaqueous electrolyte secondary battery of the present invention, it is preferable that the general formula is $Li_{3-x}V_{2-y}Fe_y(PO_4)_3$ (wherein $0 \le x < 3$ and $0.04 \le y \le 0.4$), and it is more preferable that the general formula is $Li_{3-x}V_{2-y}Fe_y(PO_4)_3$ (wherein $0 \le x < 3$ and $0.04 \le y \le 0.2$).

It is preferable that the positive active material for nonaqueous electrolyte secondary battery of the present invention further includes a conductive carbonaceous material, and that the conductive carbonaceous material is deposited on a surface of the Fe-containing lithium vanadium phosphate compound that is in the form of particles.

The nonaqueous electrolyte secondary battery according to the present invention includes a positive electrode containing the positive active material for nonaqueous electrolyte secondary battery, a negative electrode, and a nonaqueous electrolyte.

Effect of the Invention

The positive active material for nonaqueous electrolyte secondary battery of the present invention is advantageous in that it is capable of providing a battery with excellent cycle performance. In addition, the nonaqueous electrolyte secondary battery of the present invention is advantageous in that it has excellent cycle performance.

BRIEF DESCRIPTION OF THE DRAWINGS

FIG. 1 shows X-ray diffraction (XRD) patterns of $Li_3Li_{1.8}Fe_{0.2}(PO_4)_3$ and $Li_3V_2(PO_4)_3$.

MODE FOR CARRYING OUT THE INVENTION

Examples of embodiments of the present invention will be described hereinafter, but the present invention is not limited thereto.

A positive active material for nonaqueous electrolyte secondary batteries of an embodiment of the present invention is a positive active material for nonaqueous electrolyte secondary battery, which contains an Fe-containing lithium vanadium phosphate compound having a NASICON-type structure. The Fe-containing lithium vanadium phosphate compound contains at least lithium (Li), vanadium (V), and iron (Fe) as metal elements, and the percentage of iron (Fe) atoms relative to the sum of vanadium (V) and iron (Fe) atoms is 2% or more and 20% or less.

In the Fe-containing lithium vanadium phosphate compound, when the percentage of iron (Fe) atoms relative to the sum of vanadium (V) and iron (Fe) atoms is more than 20%, the relative amount of vanadium (V) decreases. As a result, the capacity of the positive active material may decrease. Meanwhile, when the percentage of iron (Fe) atoms relative to the sum of vanadium (V) and iron (Fe) atoms is less than 2%, the cycle performance of the positive active material in a battery may be insufficient.

In the Fe-containing lithium vanadium phosphate compound, it is preferable that the percentage of iron (Fe) atoms relative to the sum of vanadium and iron atoms is 5% or more; this is because this leads to even better cycle performance. Meanwhile, the percentage of iron (Fe) atoms is preferably 15% or less, and more preferably 10% or less; this is because the capacity of the positive active material can thereby be further increased.

The Fe-containing lithium vanadium phosphate compound may further include metal elements other than Li, V, and Fe. Examples of metal elements other than Li, V, and Fe include Al, Cr, Mg, Mn, Ni, and Ti. In particular, Al is preferable.

In the Fe-containing lithium vanadium phosphate compound, small amounts of anions other than phosphate ($PO_4$), such as ($BO_3$), ($WO_4$), ($MoO_4$), and ($SiO_4$), may also be in a solid solution, and such a compound is also within the scope of the right of the present invention.

The positive active material for nonaqueous electrolyte secondary battery of the embodiment of the present invention includes an Fe-containing lithium vanadium phosphate compound represented by the general formula $Li_{3-x}V_{2-y-z}Fe_yM_z(PO_4)_3$ (wherein $0 \le x < 3$, $0.04 \le y \le 0.4$, $0 \le z \le 0.1$, while $0.04 \le y+z \le 0.4$, and M represents at least one metal element selected from Al, Cr, Mg, Mn, Ni, and Ti).

In the above general formula, when the value of y is more than 0.4, the relative amount of vanadium (V) decreases. As a result, the capacity of the positive active material may decrease. Meanwhile, when the value of y is less than 0.04, the cycle performance of the positive active material in a battery may be insufficient.

In the Fe-containing lithium vanadium phosphate compound represented by the above general formula, the value of y is 0.04 or more, and the cycle performance is thus significantly excellent. In addition, it is preferable that $y \le 0.35$, more preferably $y \le 0.3$, and still more preferably $y \le 0.2$; this is because the capacity of the positive active material can thereby be further increased.

In the above general formula, it is preferable that M is aluminum (Al).

In the above general formula, it is preferable that z=0. That is, the general formula is preferably $Li_{3-x}V_{2-y}Fe_y(PO_4)_3$ (wherein $0 \le x < 3$ and $0.04 \le y \le 0.4$), and more preferably $Li_{3-x}V_{2-y}Fe_y(PO_4)_3$ (wherein $0 \le x < 3$ and $0.04 \le y \le 0.2$).

That is, it is more preferable that the positive active material for nonaqueous electrolyte secondary batteries includes an Fe-containing lithium vanadium phosphate compound represented by the general formula $Li_{3-x}V_{2-y}Fe_y(PO_4)_3$ (wherein $0 \le x < 3$ and $0.04 \le y \le 0.2$).

It is preferable that the Fe-containing lithium vanadium phosphate compound represented by the above general formula has a NASICON-type structure, more specifically a monoclinic crystal structure.

It is preferable that the positive active material for nonaqueous electrolyte secondary battery includes, in addition to the Fe-containing lithium vanadium phosphate compound having a NASICON-type structure, a compound having a crystal structure other than a NASICON-type structure. An example of the compound having another crystal structure is an orthorhombic compound having an olivine-type structure or the like. It is also preferable that the compound having a crystal structure other than a NASICON-type structure is a lithium iron phosphate compound ($LiFePO_4$) having an olivine-type structure.

The Fe-containing lithium vanadium phosphate compound is usually in the form of particles.

It is preferable that the Fe-containing lithium vanadium phosphate compound has a small secondary particle size; this is because the effects of the present invention can thereby be more reliably exhibited. A small secondary particle size is advantageous in that, for example, a positive electrode paste can be more uniformly applied onto the below-mentioned current collector.

Specifically, it is preferable that secondary particles have an average particle size of 100 μm or less, more preferably 0.5 to 50 μm. In addition, it is preferable that primary particles have a particle size of 50 to 500 nm.

The average particle size of secondary particles of the Fe-containing lithium vanadium phosphate compound can be measured from particle size distribution measurement by a liquid phase sedimentation method or a laser diffraction/scattering method. The average particle size of primary particles can be determined by the image analysis of the results of transmission electron microscope (TEM) observation.

It is preferable that the Fe-containing lithium vanadium phosphate compound particles have a large BET specific surface area as measured by nitrogen absorption; this is because a positive electrode can thereby be provided with even better high rate performance. Specifically, the BET specific surface area is preferably 1 to 100 $m^2/g$, and more preferably 5 to 100 $m^2/g$.

The compositional formula of the Fe-containing lithium vanadium phosphate compound is determined by examining the ratio of Li, V, Fe, and P using any of various, conventionally known analysis methods. Examples of analysis methods include ICP emission spectrometry, ICP mass analysis, atomic absorption, and fluorescent X-ray analysis. In addition, the crystal structure of the Fe-containing lithium vanadium phosphate compound is determined by X-ray diffraction (XRD) measurement.

In the positive active material, it is preferable that have a conductive carbonaceous material such as carbon is attached on the surface of the Fe-containing lithium vanadium phosphate compound particles thereof by a mechanical means or other means such as the thermal decomposition of an organic substance. This configuration can lead to even better electron conductivity between particles. That is, in the positive active material, it is preferable that the conductive carbonaceous material such as carbon is attached on the surface of the Fe-containing lithium vanadium phosphate compound particles; this is because the effects of the present invention can thereby be more reliably exhibited.

The mode of the attachment of the conductive carbonaceous material on the particle surface is not particularly limited, but is preferably such that the particle surface is coated with the conductive carbonaceous material; this is because this can lead to even better electron conductivity between particles. That is, it is still more preferable that the surface of the Fe-containing lithium vanadium phosphate compound particles is coated with the conductive carbonaceous material such as carbon.

The amount of the conductive carbonaceous material attached on the surface of the Fe-containing lithium vanadium phosphate compound particles can be measured by thermogravimetry (TG). In addition, the attachment of the conductive carbonaceous material on the particle surface can be confirmed by observation using a transmission electron microscope (TEM), or the like.

Next, a method for producing the positive active material for nonaqueous electrolyte secondary battery will be described.

The production method is not particularly limited. In the production method, specifically, it is possible to employ a synthesis method such as a solid phase reaction, a liquid phase reaction, a sol-gel reaction, or a hydrothermal reaction.

Basically, the Fe-containing lithium vanadium phosphate compound can be obtained by preparing a precursor (mixture) containing a raw material that contains metal elements to form the compound (Li, V, Fe) and a raw material that serves as a phosphate source in desired proportions, and then further calcining the precursor. The composition of the obtained Fe-containing lithium vanadium phosphate compound may be slightly different from the composition calculated from the loading proportions of the raw materials. In particular, it is known that a raw material containing lithium is partially volatilized during calcination. In order to deal with this, usually, a raw material containing lithium is loaded in an amount larger than the stoichiometric ratio before calcination to synthesize an Fe-containing lithium vanadium phosphate compound.

The present invention can be implemented without deviating from its technical concept or main features. Needless to say, even when the composition of the obtained Fe-containing lithium vanadium phosphate compound does not strictly agree with the above general formula, it cannot be interpreted as being outside the scope of the present invention only for this reason.

Examples of Li-containing raw materials include lithium carbonate ($Li_2CO_3$), lithium hydroxide ($LiOH$), lithium nitrate ($LiNO_3$), and lithium acetate ($CH_3COOLi$).

Examples of phosphate sources include ammonium phosphate, ammonium dihydrogen phosphate, and diammonium hydrogen phosphate.

Examples of Li-containing phosphate sources include lithium phosphate ($Li_3PO_4$) and lithium dihydrogen phosphate ($LiH_2PO_4$).

As a V-containing raw material, vanadium pentoxide ($V_2O_5$) is usually used. In addition, it is also possible to use a vanadium oxide in a low oxidation state, such as $V_2O_3$, or ammonium vanadate, for example.

Examples of Fe-containing raw materials include iron acetate, iron nitrate, and iron lactate.

In an aqueous-solution-based synthesis method such as a liquid phase reaction or a sol-gel reaction, it is preferable that the compound used as a metal source is soluble in water. In the case where a compound that is insoluble or poorly soluble in water is used as a metal source, it is preferable to change the order of mixing or to previously dissolve each raw material in purified water.

A method for attaching carbon on the surface of the Fe-containing lithium vanadium phosphate compound particles and also a method for coating the particle surface with carbon are not particularly limited. Specifically, for example, it is possible to employ a mechanical method such as a method in which the Fe-containing lithium vanadium phosphate compound particles are mixed with carbon. Carbon used in this method may be acetylene black or the like.

As a method for attaching carbon on the particle surface, it is also possible to employ a method in which an organic substance such as a solid organic substance, a liquid organic substance, or a gaseous organic substance is heat-treated together with Fe-containing lithium vanadium phosphate compound particles. Alternatively, it is also possible to employ a method in which Fe-containing lithium vanadium phosphate compound particles are placed in a temperature-rising atmosphere, and a gaseous organic substance is introduced to cause carbon deposition and vapor growth on the particle surface.

It is necessary that the temperature of the heat treatment is equal to or higher than the temperature at which the organic substance such as a gaseous organic substance is thermally decomposed. In addition, it is preferable that the temperature of the heat treatment is equal to or lower than the temperature at which the Fe-containing lithium vanadium phosphate compound particles grow.

Examples of solid organic substances include sucrose, polyvinyl alcohol, and acetylene black.

Examples of liquid organic substances include liquid polyethylene glycol.

Examples of gaseous organic substance include vaporized monohydric alcohols such as methanol, ethanol, isopropanol, and butanol, ethylene gas, and propylene gas.

Incidentally, in the heat treatment, carbon can be attached on the particle surface using a solution prepared by dissolving the solid organic substance such as sucrose in a solvent such as water, for example.

Meanwhile, in a hydrothermal reaction or a sol-gel reaction, an organic substance such as citric acid or ascorbic acid may be added to a water bath for the purpose of preventing oxidation. In a hydrothermal reaction or a sol-gel reaction, it is possible to attach carbon derived from the organic substance on the surface of Fe-containing lithium vanadium phosphate compound particles, and it is also possible to coat the particle surface with carbon derived from the organic substance. As a result, a positive active material having carbon attached on the particle surface can be obtained. Such a positive active material may be additionally subjected to the heat treatment mentioned above using an organic substance such as a gaseous organic substance. For the above synthesis methods, the examples and comparative examples of WO 2007/043665 A, for example, may be referred to.

Using a mill, a classifier, or the like, the Fe-containing lithium vanadium phosphate compound particles can be provided with a predetermined size.

Specific examples of mills usable include mortars, ball mills, sand mills, vibration ball mills, planetary ball mills, jet mills, counterjet mills, and swirling-flow-type jet mills. As a method for pulverization, it is possible to employ a wet milling method performed in the presence of water or an organic solvent such as alcohol or hexane.

Specific examples of classifiers usable include sieves and air classifiers. The classification method is not particularly limited, and it is possible to employ a method in which classification is performed using a sieve, an air classifier, or the like in a dry process or a wet process, or the like.

Subsequently, an embodiment of a nonaqueous electrolyte secondary battery of the present invention will be described in detail.

A nonaqueous electrolyte secondary battery of this embodiment includes a positive electrode containing the positive active material for nonaqueous electrolyte secondary battery mentioned above, a negative electrode, and a nonaqueous electrolyte containing an electrolyte salt and a nonaqueous solvent.

Specifically, the nonaqueous electrolyte secondary battery includes, for example, a positive electrode containing the positive active material and a positive electrode current collector; a negative electrode containing a negative active material capable of insertion/extraction lithium ions and a negative electrode current collector; a separator; and a nonaqueous electrolyte containing an electrolyte salt and a nonaqueous solvent.

An example of the nonaqueous electrolyte secondary battery is a lithium ion secondary battery or the like. Taking such a lithium ion secondary battery as an example, further description will be given hereinafter.

In the positive electrode, positive electrode materials other than the positive active material may be mixed with the positive electrode material and used to the extent that they do not interfere with the effects of the present invention.

Examples of other positive electrode materials include transition metal oxides, transition metal sulfides, and transition metal composite oxides of lithium. Binders, thickeners, and the like are also mentioned.

Examples of transition metal oxides include manganese oxide, iron oxide, copper oxide, nickel oxide, and vanadium oxide.

Examples of transition metal sulfides include molybdenum sulfide and titanium sulfide.

Examples of composite oxides of lithium and transition metals include lithium-manganese composite oxide, lithium-nickel composite oxide, lithium-cobalt composite oxide, lithium-nickel-cobalt composite oxide, lithium-nickel-manganese composite oxide, and lithium-nickel-cobalt-manganese composite oxide.

Examples of binders include thermoplastic resins such as polytetrafluoroethylene (PTFE), polyvinylidene fluoride (PVDF), polyethylene, and polypropylene, and polymers having rubber elasticity, such as ethylene-propylene-dieneter polymer (EPDM), sulfonated EPDM, styrene butadiene rubber (SBR), and fluororubber; they may be used alone or as a mixture of two or more kinds.

Examples of thickeners include polysaccharides such as carboxymethyl cellulose and methyl cellulose; they may be used alone or as a mixture of two or more kinds.

Examples of other positive electrode materials further include, but are not limited to, conductive polymer compounds such as disulfide, polypyrrole, polyaniline, poly-para-styrene, polyacetylene, and polyacene materials and also carbonaceous materials having a pseudo-graphite structure.

Materials for the positive electrode current collector to form the positive electrode are not particularly limited and may be known general materials. Specific examples thereof include metal materials, such as aluminum, nickel, titanium, and tantalum, and carbonaceous materials, such as carbon cloth and carbon paper. In particular, aluminum is more preferable.

The negative active material contained in the negative electrode is not particularly limited as long as it is capable of electrochemically insertion/extraction lithium ions. Examples thereof include carbonaceous materials, metal oxides such as tin oxide and silicon oxide, metal composite oxides such as lithium composite oxide, elemental lithium, lithium alloys such as lithium-aluminum alloy, and metals capable of forming an alloy with lithium, such as Sn and Si. They may be used alone, and it is also possible to use two or more kinds combined together in any proportions. In particular, as the negative active material, a carbonaceous material or a lithium composite oxide is preferable in terms of safety.

Examples of carbonaceous materials for the negative electrode include natural graphite, artificial graphite, cokes, non-graphitizable carbon, low-temperature-calcined graphitizable carbon, fullerenes, carbon nanotubes, carbon black, and active carbon.

Materials for the negative electrode current collector to form the negative electrode may be known general materials. Specific examples thereof include metal materials such as copper, nickel, stainless steel, and nickel-plated steel. In particular, copper is easy to process and relatively low in cost, and thus is preferable.

The nonaqueous solvent contained in the nonaqueous electrolyte is not particularly limited, and examples thereof include nonaqueous solvents (organic solvents) commonly used in a nonaqueous electrolyte of a lithium ion secondary battery.

Examples of nonaqueous solvents include cyclic carbonates such as propylene carbonate, ethylene carbonate, butylene carbonate, chloroethylene carbonate, styrene carbonate, catechol carbonate, 1-phenyl vinylene carbonate, and 1,2-diphenyl vinylene carbonate, cyclic carboxylic acid esters such as γ-butyrolactone, γ-valerolactone, and propiolactone, chain carbonates such as dimethyl carbonate, diethyl carbonate, ethyl methyl carbonate, and diphenyl carbonate, chain carboxylic acid esters such as methyl acetate and methyl butyrate, tetrahydrofuran and derivatives thereof, ethers such as 1,3-dioxane, dimethoxyethane, diethoxyethane, methoxyethoxy ethane, and methyl diglyme, nitriles such as acetonitrile and benzonitrile, and dioxolane and derivatives thereof.

The nonaqueous solvent may be, but is not limited thereto, one of the above solvents alone, a mixture of two or more kinds, etc. Incidentally, as the nonaqueous solvent, it is possible to use two or more kinds of the above solvents mixed in any proportions.

The electrolyte salt contained in the nonaqueous electrolyte is not particularly limited, and specific examples thereof include lithium salts that are commonly used for lithium-ion secondary battery and stable in a wide potential range.

Specific examples of lithium salts include $LiBF_4$, $LiPF_6$, $LiClO_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, and $LiC(C_2F_5SO_2)_3$. They may be used alone, and it is also possible to use a mixture of two or more kinds.

The concentration of the electrolyte salt in the nonaqueous electrolyte is preferably 0.1 mold to 5.0 mol/l, and still more preferably 0.8 mol/l to 2.0 mol/l; this is because a battery having high rate discharge performance can thereby be more reliably obtained.

In addition to the nonaqueous solvent and the electrolyte salt, the nonaqueous electrolyte may contain other nonaqueous electrolyte components to the extent that they do not interfere with the effects of the present invention.

Examples of other nonaqueous electrolyte components include aromatic compounds such as biphenyl, alkyl biphenyls, terphenyl, partially hydrogenated terphenyl, cyclohexylbenzene, t-butylbenzene, t-amylbenzene, diphenyl ether, and dibenzofuran; partially fluorinated aromatic compounds such as 2-fluorobiphenyl, o-cyclohexylfluorobenzene, and p-cyclohexylfluorobenzene; overcharge inhibitors such as fluorine-containing anisole compounds including 2,4-difluoroanisole, 2,5-difluoroanisole, 2,6-difluoroanisole, 3,5-difluoroanisole, and the like; negative-electrode coat-forming agents such as vinylene carbonate, vinylethylene carbonate, fluoroethylene carbonate, trifluoropropylene carbonate, succinic anhydride, glutaric anhydride, maleic anhydride, citraconic anhydride, glutaconic anhydride, itaconic anhydride, and cyclohexanedicarboxylic anhydride; and positive-electrode protecting agents such as ethylene sulfite, propylene sulfite, dimethyl sulfite, propane sultone, propene sultone, butane sultone, methyl methanesulfonate, busulfan, methyl toluenesulfonate, dimethyl sulfate, ethylene sulfate, sulfolane, dimethyl sulfone, diethyl sulfone, dimethyl sulfoxide, diethyl sulfoxide, tetramethylene sulfoxide, diphenyl sulfide, thioanisole, diphenyl disulfide, and dipyridinium disulfide.

In the nonaqueous electrolyte, two or more kinds of the other nonaqueous electrolyte components mentioned above may be used together, and a negative-electrode coat-forming agent and a positive-electrode protecting agent may also be used together. It is preferable that an overcharge inhibitor, a negative-electrode coat-forming agent, and a positive-electrode protecting agent are used together.

In the nonaqueous electrolyte, the contents of the other nonaqueous electrolyte components are not particularly limited, but are preferably such that the content of each of the other nonaqueous electrolyte components is 0.01 mass % or more, more preferably 0.1 mass % or more, and still more preferably 0.2 mass % or more. In addition, the content is preferably 5 mass % or less, more preferably 3 mass % or less, and still more preferably 2 mass % or less. When the other nonaqueous electrolyte components are contained in the nonaqueous electrolyte, the battery has even higher safety, and the capacity retention performance after high-temperature storage and cycle performance can be further improved.

Examples of separators include microporous films and nonwoven fabrics; they may be used alone, and it is also possible to use two or more kinds together.

Examples of materials for the separator include polyolefin resins such as polyethylene and polypropylene, polyester resins such as polyethylene terephthalate and polybutylene terephthalate, polyvinylidene fluoride, vinylidene fluoride-hexafluoropropylene copolymers, vinylidene fluoride-perfluorovinylether copolymers, vinylidene fluoride-tetrafluoroethylene copolymers, vinylidene fluoride-trifluoroethylene copolymers, vinylidene fluoride-fluoroethylene copolymers, vinylidene fluoride-hexafluoroacetone copolymers, vinylidene fluoride-ethylene copolymers, vinylidene fluoride-propylene copolymers, vinylidene fluoride-trifluoropropylene copolymers, vinylidene fluoride-tetrafluoroethylene-hexafluoropropylene copolymers, and vinylidene fluoride-ethylene-tetrafluoroethylene copolymers.

It is preferable that the separator is formed of a microporous film containing a polyolefin resin, such as polyethylene or polypropylene, as a main component.

Other components forming the battery include a terminal, an insulating plate, a battery case, and the like. As these components, conventionally known, general ones can be used.

The nonaqueous electrolyte secondary battery can be produced by a conventionally known, general method. Specifically, it can be produced by the method described in the Examples, for example.

EXAMPLES

Hereinafter, the present invention will be described in further detail with reference to examples and comparative examples. However, the present invention is not limited the following embodiments.

In the synthesis of a positive active material, a sol-gel reaction using citric acid was employed. Citric acid promotes complex formation. As a result, a precursor solution can be uniformly mixed, whereby primary particles of a lithium vanadium phosphate compound can be made small. In addition, citric acid is converted into carbon by the below-mentioned calcination, and the carbon is attached on the surface of primary particles. Incidentally, the synthesis method is not limited to a sol-gel reaction, and may also be a solid phase reaction, a hydrothermal reaction or the like.

Example 1

Synthesis of $Li_3V_{1.96}Fe_{0.04}(PO_4)_3$

Iron lactate-trihydrate, an iron source, was previously dissolved in 10 ml of purified water. Lithium hydroxide-monohydrate ($LiOH—H_2O$) as a lithium source, vanadium pentoxide ($V_2O_5$) as a vanadium source, the previously prepared aqueous solution of iron lactate-trihydrate, citric acid-monohydrate as an oxidation inhibitor and a carbon source, and ammonium dihydrogen phosphate ($NH_4H_2PO_4$) as a phosphate source were added to 50 ml of purified water in this order; after confirming that one raw material was dissolved, the next raw material was then added. The loading proportions were adjusted such that the molar ratio of $LiOH—H_2O$: $V_2O_5$: iron lactate-trihydrate:citric acid-monohydrate $NH_4H_2PO_4$ was 3.03:0.98:0.04:1.5:3, and also that the LiOH concentration in the precursor solution was 1 mol/l.

The solution was evaporated to dryness on a hot plate equipped with a magnetic stirrer. The dried precursor was pulverized in an automatic mortar, placed in a sagger made of alumina (outline dimension: 90×90×50 mm), and subjected to preliminary calcination and main calcination under nitrogen gas flow (flow rate: 1.0 l/min) in an atmosphere-replacement-type calcining furnace (desktop vacuum gas replacement furnace KDF-75 manufactured by DENKEN Co., Ltd., volume: 2.4 l).

In the preliminary calcination, the calcination temperature was 350° C., the calcination time (duration of maintaining the calcination temperature) was 3 hours, and the lowering of temperature was not performed. In the subsequent main calcination, the calcination temperature was 850° C., and the calcination time was 6 hours. In each calcination, the temperature rising rate was 5° C./min. In addition, the lowering of temperature in the main calcination was performed by allowing the temperature to fall naturally, and, in order to avoid the oxidation of the product after calcination, the calcined product was taken out after the temperature of the furnace fell to 50° C. or less. Incidentally, after a sample was introduced into the furnace, nitrogen gas was constantly fed from the time when the temperature was raised until the time when the sample was taken out.

Next, the calcined product was pulverized in an automatic mortar for 1 hour to produce a pulverized product having a maximum secondary particle size of 50 μm or less. The secondary particle size was calculated from particle size distribution measurement by a liquid phase sedimentation method. It was confirmed by transmission electron microscope (TEM) observation that in the pulverized product, carbon derived from citric acid was attached on the surface of primary particles of $Li_3Li_{1.98}Fe_{00.02}(PO_4)_3$, and also the particle surface was coated with the carbon. Similar carbon was confirmed also in the following examples and comparative examples.

The positive active material thus produced is defined as an Example active material a1.

Example 2

Synthesis of $Li_3V_{1.8}Fe_{0.2}(PO_4)_3$

Fe-containing lithium vanadium phosphate was synthesized in the same manner as in Example 1, except that the loading proportions were such that the molar ratio of $LiOH—H_2O$:$V_2O_5$:iron lactate-trihydrate:citric acid-monohydrate: $NH_4H_2PO_4$ was 3.03:0.9:0.2:1.5:3. The positive active material thus produced is defined as an Example active material a2.

Example 3

Synthesis of $Li_3V_{1.88}Fe_{0.06}Al_{0.06}(PO_4)_3$

Fe- and Al-containing lithium vanadium phosphate was synthesized in the same manner as in Example 1, expect that after lithium hydroxide-monohydrate ($LiOH—H_2O$) was added to 50 ml of purified water, aluminum metal (Al) was added before adding vanadium pentoxide ($V_2O_5$), and that the loading proportions were such that the molar ratio of $LiOH—H_2O$:Al:$V_2O_5$:iron lactate-trihydrate:citric acid-monohydrate:$NH_4H_2PO_4$ was 3.03:0.06:0.94:0.06:1.5:3. The positive active material thus produced is defined as an Example active material a3.

Example 4

Synthesis of $Li_3V_{1.8}Fe_{0.1}Al_{0.1}(PO_4)_3$

Fe- and Al-containing lithium vanadium phosphate was synthesized in the same manner as in Example 3, except that the loading proportions were such that the molar ratio of $LiOH—H_2O$:Al:$V_2O_5$:iron lactate-trihydrate:citric acid-monohydrate:$NH_4H_2PO_4$ was 3.03:0.1:0.9:0.1:1.5:3. The positive active material thus produced is defined as an Example active material a4.

Comparative Example 1

Synthesis of $Li_3V_2(PO_4)_3$

Lithium vanadium phosphate was synthesized in the same manner as in Example 1, except that iron lactate-trihydrate, an iron source, was not added to the raw materials, and that the loading proportions were such that the molar ratio of $LiOH—H_2O$:$V_2O_5$:citric acid-monohydrate:$NH_4H_2PO_4$ was 3.03:1:1.5:3. The positive active material thus produced is defined as a Comparative Example active material b1.

Comparative Example 2

Synthesis of $Li_3V_{1.98}Fe_{0.02}(PO_4)_3$

Fe-containing lithium vanadium phosphate was synthesized in the same manner as in Example 1, except that the loading proportions were such that the molar ratio of $LiOH—H_2O$:$V_2O_5$:iron:lactate-trihydrate:citric acid-monohydrate: $NH_4H_2PO_4$ was 3.03:0.99:0.02:1.5:3. The positive active material thus produced is defined as a Comparative Example active material b2.

Comparative Example 3

Synthesis of $Li_3V_{1.96}Fe_{0.02}Al_{0.02}(PO_4)_3$

Fe- and Al-containing lithium vanadium phosphate was synthesized in the same manner as in Example 3, except that the loading proportions were such that the molar ratio of $LiOH—H_2O$:Al:$V_2O_5$:iron lactate-trihydrate:citric acid-monohydrate:$NH_4H_2PO_4$ was 3.03:0.02:0.98:0.02:1.5:3.

The positive active material thus produced is defined as a Comparative Example active material b3.

Comparative Example 4

Synthesis of $Li_3V_{1.96}Al_{0.04}(PO_4)_3$

Al-containing lithium vanadium phosphate was synthesized in the same manner as in Example 3, except that iron lactate-trihydrate, an iron source, was not added to the raw materials, and that the raw material were mixed in such loading proportions that the molar ratio of $LiOH—H_2O:Al:V_2O_5$: citric acid-monohydrate:$NH_4H_2PO_4$ was 3.03:0.04:0.98:1.5:3. The positive active material thus produced is defined as a Comparative Example active material b4.

Comparative Example 5

Synthesis of $Li_3V_{1.96}Cr_{0.04}(PO_4)_3$

Cr-containing lithium vanadium phosphate was synthesized in the same manner as in Example 1, except that chromium acetate n-hydrate (Cr content: 21 to 24 mass %) was used in place of iron lactate-trihydrate. The positive active material thus produced is defined as a Comparative Example active material b5.

It was confirmed by X-ray diffraction (XRD) measurement using a CuKα ray that the active materials synthesized in the Examples and Comparative Examples each had, as the main phase, a NASICON-type structure made mainly of $Li_3V_2(PO_4)_3$. In an active material where the percentage of iron atoms relative to the sum of vanadium and iron atoms was 10%, peaks due to $LiFePO_4$ having an olivine-type structure were also observed. The XRD patterns of the positive active materials produced in Example 2 and Comparative Example 1 are shown in FIG. 1.

(Production of Positive Electrode)

A positive electrode paste containing the Example active material a1, acetylene black as a conductive agent, and polyvinylidene fluoride (PVdF) as a binder in the following mass ratio: Example active material a1:acetylene black:PVdF=82:10:8, and further containing N-methyl-2-pyrrolidone (NMP) as a solvent, was prepared.

The positive electrode paste was applied to both sides of an aluminum mesh current collector having an aluminum terminal, and NMP was removed at 80° C. After that, it was folded such that the application region was in two layers and the projected area of the application region was halved, and then pressed such that the thickness after folding was 400 μm. The active material application area after folding was 2.25 $cm^2$ and the application mass was 0.071 g. Drying was then performed under reduced pressure at 150° C. for 5 hours to remove moisture in the electrode plate. A positive electrode was thus produced.

In the same manner, positive electrodes were produced using the Example active materials a2 to a4 and the Comparative Example active materials b1 to b5.

(Production of Negative Electrode)

A lithium metal foil having thickness of 300 μm was attached to both sides of a mesh current collector made of stainless steel (product name: SUS 316) having a terminal made of stainless steel (product name: SUS 316), and then pressed to produce a negative electrode.

(Production of Reference Electrode)

A lithium metal foil having thickness of 300 μm was attached to a current-collecting bar made of stainless steel (product name: SUS 316) to produce a reference electrode.

(Preparation of Electrolyte Solution)

$LiPF_6$, a fluorine-containing electrolyte salt, was dissolved in a concentration of 1.0 mol/l in a nonaqueous solvent containing ethylene carbonate, dimethyl carbonate, and ethyl methyl carbonate mixed in a volume ratio of 1:1:1, thereby preparing a nonaqueous electrolyte. The nonaqueous electrolyte was prepared to a moisture content of less than 50 ppm.

(Production of Lithium Ion Secondary Battery)

Using the positive electrodes produced from the positive active materials of Examples 1 to 4 and Comparative Examples 1 to 5, lithium ion secondary batteries were produced by the following procedure.

That is, a lithium ion secondary battery made of glass was produced in an Ar box having a dew point of −40° C. or less. Specifically, one positive electrode, one negative electrode, and one reference electrode were inserted into gold-plated clips having a lead portion previously fixed to a case cover, and they were fixed in such a manner that the positive electrode and the negative electrode faced each other. The reference electrode was fixed to a position behind the positive electrode as seen from the negative electrode. Next, a cup made of polypropylene containing a certain amount of an electrolyte solution was placed in a glass case. The case was then covered in such a manner that the positive electrode, the negative electrode, and the reference electrode were immersed in the electrolyte solution. A battery was thus produced.

Example Batteries A1 to A4 and Comparative Example Batteries B1 to B5

Lithium ion secondary batteries using the positive electrodes containing the Example active materials a1 to a4 are defined as Example batteries A1 to A4, respectively, and lithium ion secondary batteries using the positive electrodes containing the Comparative Example active materials b1 to b5 are defined as Comparative Example batteries B1 to B5, respectively.

In addition, because $LiFePO_4$ was by-produced in a positive active material having a relatively high Fe content, in order to examine the effect of $LiFePO_4$ on cycle performance, a positive electrode was produced using a positive active material produced by merely mixing $Li_3V_2(PO_4)_3$ particles and $LiFePO_4$ particles. Further, lithium ion secondary batteries having such a positive electrode were produced as Comparative Example batteries C1 to C4. The details of the Comparative Example batteries C1 to C4 are shown below.

Comparative Example Battery C1

The Comparative Example battery C1 was produced in the same manner as for the Example battery A1, except that a mixture of $Li_3V_2(PO_4)_3$ and $LiFePO_4$ in a mass ratio of 98:2 was used as a positive active material.

Comparative Example Battery C2

The Comparative Example battery C2 was produced in the same manner as for the Example battery A1, except that a mixture of $Li_3V_2(PO_4)_3$ and $LiFePO_4$ in a mass ratio of 95:5 was used as a positive active material.

Comparative Example Battery C3

The Comparative Example battery C3 was produced in the same manner as for the Example battery A1, except that a mixture of $Li_3V_2(PO_4)_3$ and $LiFePO_4$ in a mass ratio of 90:10 was used as a positive active material.

Comparative Example Battery C4

The Comparative Example battery C4 was produced in the same manner as for the Example battery A1, except that a mixture of $Li_3V_2(PO_4)_3$ and $LiFePO_4$ in a mass ratio of 85:15 was used as a positive active material.

<Cycle Performance Test>

The Example batteries A1 to A4, Comparative Example batteries B1 to B5, and Comparative Example batteries C1 to C4 produced as above were subjected to a cycle performance test of 50 cycles at a temperature of 25° C. Charge conditions were as follows: constantcurrent-constantvoltage charge at a current of 9 mA and a voltage of 4.5 V for 2 hours. Discharge conditions were as follows: constantcurrent discharge at a current of 9 mA and a final voltage of 2.7 V. The discharge capacity obtained in the first cycle was taken as the initial capacity. The discharge capacity in the $50^{th}$ cycle was divided by the discharge capacity in the first cycle to determine the cycle capacity retention ratio. The results are shown in Table 1.

TABLE 1

| | Substitution element*/mol % | | | Main positive active material | Initial capacity/ mAh g$^{-1}$ | Cycle capacity retention ratio/% | Fe/(V + Fe) % |
|---|---|---|---|---|---|---|---|
| | Fe | Al | Cr | | | | |
| Example battery A1 | 2 | — | — | $Li_3V_{1.96}Fe_{0.04}(PO_4)_3$ | 139.9 | 92.5 | 2 |
| Example battery A2 | 10 | — | — | $Li_3V_{1.8}Fe_{0.2}(PO_4)_3$ | 124.9 | 99.1 | 10 |
| Example battery A3 | 3 | 3 | — | $Li_3V_{1.88}Fe_{0.06}Al_{0.06}(PO_4)_3$ | 137.7 | 90.6 | 3 |
| Example battery A4 | 5 | 5 | — | $Li_3V_{1.8}Fe_{0.1}Al_{0.1}(PO_4)_3$ | 125.9 | 93.9 | 5 |
| Comparative Example battery B1 | — | — | — | $Li_3V_2(PO_4)_3$ | 146.5 | 89.2 | — |
| Comparative Example battery B2 | 1 | — | — | $Li_3V_{1.98}Fe_{0.02}(PO_4)_3$ | 139.2 | 85.5 | 1 |
| Comparative Example battery B3 | 1 | 1 | — | $Li_3V_{1.96}Fe_{0.02}Al_{0.02}(PO_4)_3$ | 143.8 | 89.1 | 1 |
| Comparative Example battery B4 | — | 2 | — | $Li_3V_{1.96}Al_{0.04}(PO_4)_3$ | 141.8 | 88.5 | — |
| Comparative Example battery B5 | — | — | 2 | $Li_3V_{1.96}Cr_{0.04}(PO_4)_3$ | 141.7 | 90.0 | — |
| Comparative Example battery C1 | — | — | — | 98%$Li_3V_2(PO_4)_3$ + 2%$LiFePO_4$ | 132.9 | 89.1 | — |
| Comparative Example battery C2 | — | — | — | 95%$Li_3V_2(PO_4)_3$ + 5%$LiFePO_4$ | 123.7 | 87.5 | — |
| Comparative Example battery C3 | — | — | — | 90%$Li_3V_2(PO_4)_3$ + 10%$LiFePO_4$ | 124.5 | 89.0 | — |
| Comparative Example battery C4 | — | — | — | 85%$Li_3V_2(PO_4)_3$ + 15%$LiFePO_4$ | 127.2 | 89.2 | — |

*Substitution element: showing mol % of each metal relative to the total moles of metals excluding Li.

As shown in Table 1, as compared with the Comparative Example battery B1 using $Li_3V_2(PO_4)_3$, the Example batteries A1 and A2 using an Fe-containing lithium vanadium phosphate compound in which the percentage of Fe atoms relative to the sum of vanadium (V) and iron (F) atoms was 2% or more showed an excellent cycle capacity retention ratio. In addition, the Example batteries A3 and A4 using a compound further containing aluminum (Al), in which the percentage of Fe atoms relative to the sum of vanadium (V) and iron (F) atoms was 3% or more, also showed an excellent cycle capacity retention ratio.

Meanwhile, in the Comparative Example batteries B2 and B3 using a compound in which the percentage of Fe atoms relative to the sum of vanadium (V) and iron (F) atoms was 1%, the cycle performance was not necessarily sufficient. This showed that in an Fe-containing lithium vanadium phosphate compound, when the percentage of Fe atoms relative to the sum of vanadium (V) and iron (F) atoms is 2% or more, it is effective in improving cycle performance.

In addition, as shown by the comparison between the Example battery A1 and the Example battery A2 and also by the comparison between the Example battery A3 and the Example battery A4 in Table 1, it is recognized that an increase in Fe content leads to an increase in the cycle capacity retention ratio but also leads to a decrease in the discharge capacity. It can thus be said that in order to achieve both high discharge capacity and excellent cycle performance, it is necessary that the percentage of Fe atoms relative to the sum of vanadium (V) and iron (F) atoms is 20% or less. In addition, it appears more preferable that the percentage of Fe atoms is 10% or less.

In addition, the Comparative Example batteries B4 and B5 using a lithium vanadium phosphate compound containing Al or Cr and not containing Fe for the positive electrode showed the same level of cycle capacity retention ratio as in the case of the Comparative Example battery B1 using $Li_3V_2(PO_4)_3$ containing none of Fe, Al, and Cr. It was thus found that in order to achieve excellent cycle performance, it is necessary to select Fe as an element to be further contained in a lithium vanadium phosphate compound.

The reason why an Fe-containing lithium vanadium phosphate compound containing lithium (Li), vanadium (V), and iron (Fe) as metal elements has excellent cycle performance has not yet been fully clarified, but it is speculated that this is because vanadium of a lithium vanadium phosphate compound having a NASICON-type structure is partially substituted with iron, whereby the change in the volume of crystals accompanying the insertion/extraction of lithium ions is suppressed.

In addition, it is also believed that because the lithium vanadium phosphate compound further contains iron, the activity of the particle surface changes, and the electrolyte solution is thus suppressed to oxidative decomposition, resulting in excellent cycle performance. In addition, it is also believed that because the lithium vanadium phosphate compound further contains iron, a coat that suppresses oxidative decomposition is formed, resulting in excellent cycle performance. It is also possible that the oxidative decomposition product formed in the positive electrode affects the negative electrode and contributes to cycle performance.

Further, as shown in FIG. 1, in an active material having a relatively high Fe content, $LiFePO_4$ having an olivine-type structure was observed as a by-product in X-ray diffraction (XRD) measurement. In this connection, the effect of the presence of $LiFePO_4$ on cycle performance was examined (Comparative Example batteries C1 to C4). As a result, as shown by the Comparative Example batteries C1 to C4, the mere mixing of $Li_3V_2(PO_4)_3$ and $LiFePO_4$ did not give any change in cycle performance. Therefore, it is speculated that $LiFePO_4$ merely mixed into an active material does not affect cycle performance, but Fe dissolved in the crystal leads to excellent cycle performance. Alternatively, it is also possible that a $LiFePO_4$ phase is formed partially in primary particles having the Fe-containing lithium vanadium phosphate compound as the main phase, whereby a change in crystal structure in the active material is suppressed.

The following explains main peaks due to $LiFePO_4$ having an olivine-type structure shown in the XRD pattern of FIG. 1. The main peaks are observed near $2\theta=17.1°$, 20.8°, 25.5°, 29.7°, 32.2°, and 35.5°. Meanwhile, main peaks due to an Fe-containing lithium vanadium phosphate compound having a NASICON-type structure are observed near $2\theta=16.3°$, 20.6°, 23.0°, 24.2°, 26.4°, 27.4°, 29.3°, 32.0°, 33.0°, 33.6°, and 36.2°. Incidentally, in the upper XRD pattern of FIG. 1, the peaks due to respective compounds partially overlap with each other.

From the above, in an Fe-containing lithium vanadium phosphate compound having a NASICON-type structure, when the percentage of iron atoms relative to the sum of vanadium and iron atoms is 2% or more and 20% or less, a positive active material containing the Fe-containing lithium vanadium phosphate compound can provide a nonaqueous electrolyte secondary battery having excellent cycle performance.

The invention claimed is:

1. A positive active material for nonaqueous electrolyte secondary battery, comprising an Fe-containing lithium vanadium phosphate compound having a NASICON-type structure, wherein the Fe-containing lithium vanadium phosphate compound contains at least lithium (Li), vanadium (V), and iron (Fe) as metal elements, with the percentage of iron atoms relative to the sum of vanadium and iron atoms being 5% or more and 10% or less, further comprising a conductive carbonaceous material, wherein the conductive carbonaceous material is coated on a surface of the Fe-containing lithium vanadium phosphate compound that is in the form of particles.

2. The positive active material for nonaqueous electrolyte secondary batteries according to claim 1, further including a different phase having a crystal structure other than a NASICON-type structure.

3. The positive active material for nonaqueous electrolyte secondary battery according to claim 2, wherein the different phase having a crystal structure other than a NASICON-type structure is made of $LiFePO_4$ having an olivine-type structure.

4. The positive active material for nonaqueous electrolyte secondary battery according to claim 1, wherein the Fe-containing lithium vanadium phosphate compound represented by the general formula $Li_{3-x}V_{2-y-z}Fe_yM_z(PO_4)_3$ wherein $0 \leq x < 3$, $0.1 \leq y \leq 0.2$, $0 \leq z \leq 0.1$, while $0.1 \leq y+z \leq 0.3$, and M represents at least one metal element selected from Al, Cr, Mg, Mn, Ni, and Ti.

5. The positive active material for nonaqueous electrolyte secondary battery according to claim 4, wherein the general formula is $Li_{3-x}V_{2-y}Fe_y(PO_4)_3$ wherein $0 \leq x < 3$ and $0.1 \leq y \leq 0.2$.

6. The positive active material for nonaqueous electrolyte secondary battery according to claim 1, wherein the average particle size of secondary particle is 0.5 to 50 μm.

7. A nonaqueous electrolyte secondary battery comprising a positive electrode containing the positive active material for nonaqueous electrolyte secondary battery according to claim 1, a negative electrode, and a nonaqueous electrolyte.

8. The positive active material for nonaqueous electrolyte secondary battery according to claim 1, wherein the average particle size of secondary particle is 0.5 to 50 μm.

* * * * *